(12) United States Patent
Saitou et al.

(10) Patent No.: US 7,082,761 B2
(45) Date of Patent: Aug. 1, 2006

(54) HYDRAULIC CONTINUOUSLY VARIABLE TRANSMISSION

(75) Inventors: Mitsuru Saitou, Saitama (JP); Yasushi Fujimoto, Saitama (JP); Katsuhiko Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 10/799,580

(22) Filed: Mar. 12, 2004

(65) Prior Publication Data

US 2004/0206077 A1   Oct. 21, 2004

(30) Foreign Application Priority Data

Mar. 31, 2003   (JP) .............................. 2003-096867

(51) Int. Cl.
*F16D 39/00*   (2006.01)

(52) U.S. Cl. ......................................... 60/487; 92/12.2

(58) Field of Classification Search .................. 60/487; 92/12.2; 384/513
See application file for complete search history.

(56) References Cited

U.S. PATENT DOCUMENTS 4,938,024 A * 7/1990 Matsuto et al. ............... 60/487

5,834,662 A * 11/1998 Stoll et al. ................... 384/513
6,324,843 B1 * 12/2001 Yasuda et al. ................ 60/489

FOREIGN PATENT DOCUMENTS

| JP | 63140163 | 6/1988 |
|---|---|---|
| JP | 06002753 | 1/1994 |
| JP | 06042446 | 2/1994 |

* cited by examiner

*Primary Examiner*—F. Daniel Lopez

(74) *Attorney, Agent, or Firm*—Carrier, Blackman & Associates, P.C.; William D. Blackman; Joseph P. Carrier

(57) ABSTRACT

A hydraulic continuously variable transmission includes a swash plate plunger pump, a swash plate plunger motor, and a closed hydraulic circuit for connecting them to each other, wherein a motor pivoting member is supported by a motor casing so as to be pivotally movable, with the swash plate angle being variably adjustable, to simplify the configuration of a swash plate as much as possible and to widen the swash plate angle range. An inner race of a ball bearing for supporting a transmission output shaft, to which a pump cylinder and a motor cylinder are connected, so that the transmission output shaft is rotatable relative to the motor casing is formed by cutting off an end face portion in the axial direction, on the side of facing the motor pivoting member.

7 Claims, 8 Drawing Sheets

HYDRAULIC CONTINUOUSLY VARIABLE TRANSMISSION

CROSS-REFERENCE TO RELATED APPLICATIONS

The present invention claims priority under 35 USC 119 based on Japanese patent application No. 2003-096867, filed Mar. 31, 2003.

BACKGROUND OF THE INVENTION

1. Field of the Invention

This invention relates to a continuously variable automatic transmission. More particularly, the present invention relates to a hydraulic continuously variable transmission, including a swash plate plunger pump and a swash plate plunger motor connected to each other through a closed hydraulic circuit.

2. Description of the Background Art

As to hydraulic continuously variable transmissions including a hydraulic pump and a hydraulic motor in combination, a variety of forms and configurations of such transmissions have been known and put to practical use. One example of a commercial hydraulic continuously variable transmission was sold by Honda and marketed under the trademark "Hondamatic" on the 2001 Honda Fourtrax Foreman Rubicon™ TRX500 RTV.

Another example of a known hydraulic continuously variable transmission is disclosed in Japanese Patent Laid-open No. Hei 6-2753, Japanese Patent Laid-open No. Hei 6-42446, and Japanese Patent Publication No. Hei 7-88884 proposed by the present applicant. The hydraulic continuously variable transmission disclosed in these patent documents includes a swash plate plunger pump, a swash plate plunger motor, and a closed hydraulic circuit for connecting a discharge port and a suction port of the swash plate plunger pump to a suction port and a discharge port, respectively, of the swash plate plunger motor, wherein a pump swash plate member is driven by an engine, a pump cylinder and a motor cylinder are connected to each other and disposed in a connected state on an output shaft, a motor swash plate is restricted in rotation, and the motor swash plate angle can be variably adjusted.

In the hydraulic continuously variable transmission referenced above, the motor swash plate angle is variably regulated to vary the volume of the motor, thereby performing a continuously variable speed change control for steplessly varying the motor output rotation. In other words, the speed change control range (speed change ratio range) of the hydraulic continuously variable transmission is determined by the regulation range of the motor swash plate angle. Generally, the speed change control range is required to be wide, and it is necessary to widen the regulation range of the motor swash plate angle as much as possible.

In the hydraulic continuously variable transmission as disclosed in the above patent references, however, a motor swash plate (motor oscillating member) is pivotally supported by a motor casing (swash plate support member), and the output shaft, with a motor cylinder connected thereto, is rotatably supported on the motor casing through a rotatable bearing.

However, there has been the problem that an attempt to pivotally move the motor swash plate to its maximum extent leads to interference of a swash plate support member with the rotatable bearing.

In addition, in the conventional hydraulic continuously variable transmission described in the above patent references, an end portion of the swash plate support member is skewly cut, in order to obviate the interference with the rotatable bearing, and to enlarge the angle of available motion. In this case, however, the skew cutting of the end portion of the swash plate support member complicates the processing steps, leading to a rise in the component part production cost.

Although the known devices have some utility for their intended purposes, there is still a need to provide an improved hydraulic continuously variable transmission. More particularly, there is a need for an improved hydraulic continuously variable transmission including a swash plate plunger pump and a swash plate plunger motor connected to each other through a closed hydraulic circuit.

SUMMARY OF THE INVENTION

The present invention has been made in consideration of the above-mentioned problems. Accordingly, it is an object of the present invention to provide a hydraulic continuously variable transmission configured so that it is possible to enlarge the pivot angle of a pivotally movable member, which rotatably supports a swash plate member and is pivotally movable about a pivot axis perpendicular to the rotary axis, without lowering the processability of the pivoting member.

In order to attain the above object, a continuously variable transmission according to an illustrative embodiment of the present invention is provided, including a swash plate plunger pump, a swash plate plunger motor, and a closed hydraulic circuit for interconnecting the swash plate plunger pump and the swash plate plunger motor.

In the continuously variable transmission according to the illustrative embodiment, at least one of a pump swash plate of the swash plate plunger pump and a motor swash plate of the swash plate plunger motor (for example, a motor pivoting member in an embodiment) is supported by a swash plate support member (for example, a motor casing in an embodiment) so as to be pivotally movable, with the swash plate angle being variably adjustable.

Also in the continuously variable transmission according to the illustrative embodiment hereof, an output shaft, for supporting a pump cylinder of the swash plate plunger pump and a motor cylinder of the swash plate plunger motor, is rotatably supported through a plurality of rotatable bearings. In addition, an inner race of the rotatable bearing attached to the swash plate support member and rotatably supporting the output shaft, is formed by cutting off an end face portion in the width direction, on the side facing the pump swash plate or the motor swash plate, supported by the swash plate support member so as to be pivotally movable.

In the hydraulic continuously variable transmission configured as above, since the inner race of the rotatable bearing is formed by cutting off an end face portion in the width direction on the side of facing the pump or motor swash plate member, it is possible to widen the range of movement over which the pump or motor swash plate member can be pivoted, without interference with the inner race. As a result, it is possible to widen the regulation range of the motor swash plate angle, and to thereby widen the speed change control range.

For a more complete understanding of the present invention, the reader is referred to the following detailed description section, which should be read in conjunction with the

DETAILED DESCRIPTION

Figure 2:
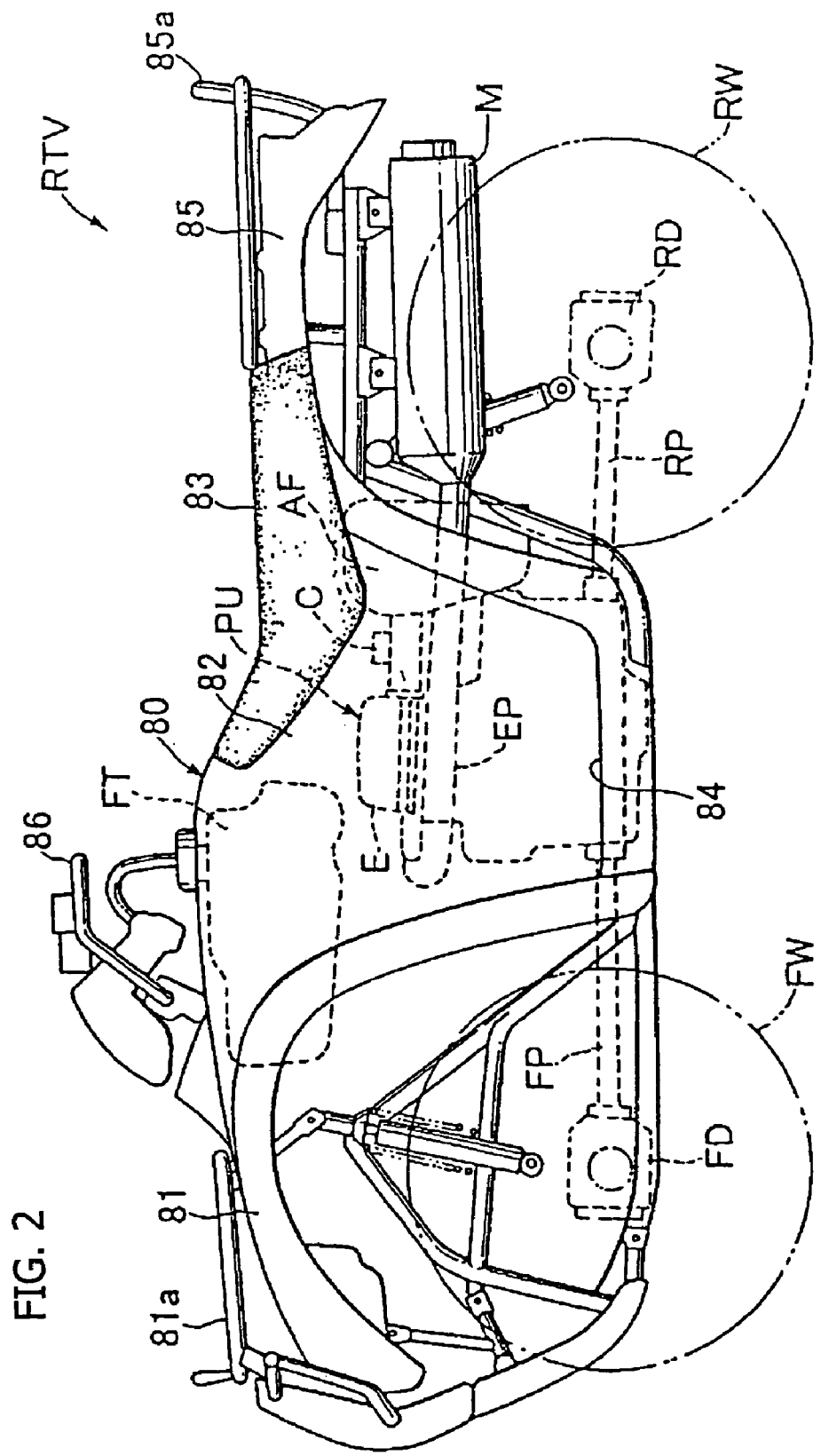
FIG. 2 is a side elevational view of an all-terrain vehicle including the above hydraulic continuously variable transmission according to an embodiment of the present invention.
Figure 3:
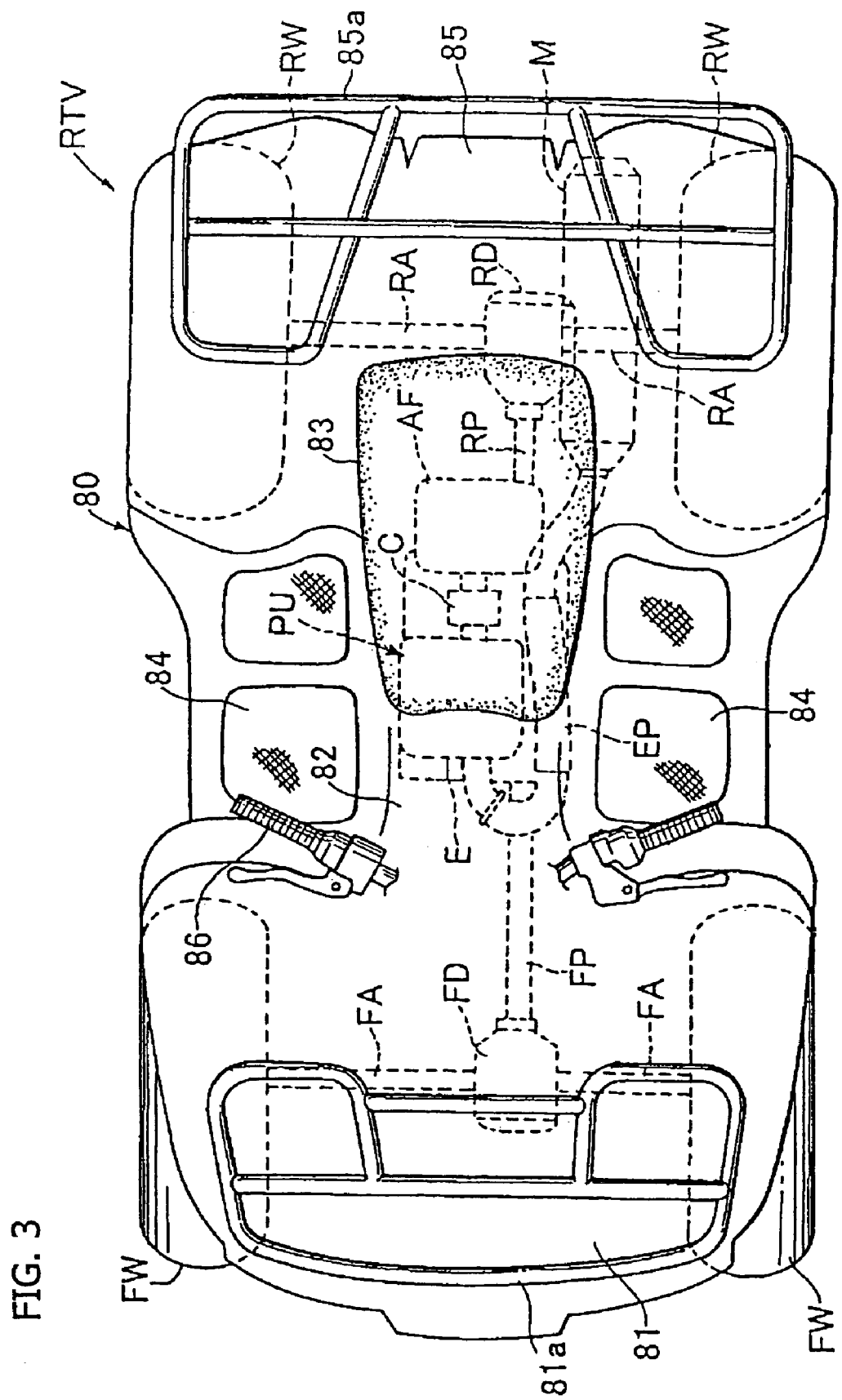
FIG. 3 is a top plan view of the all-terrain vehicle including the hydraulic continuously variable transmission according to an embodiment of the present invention.
Figure 4:
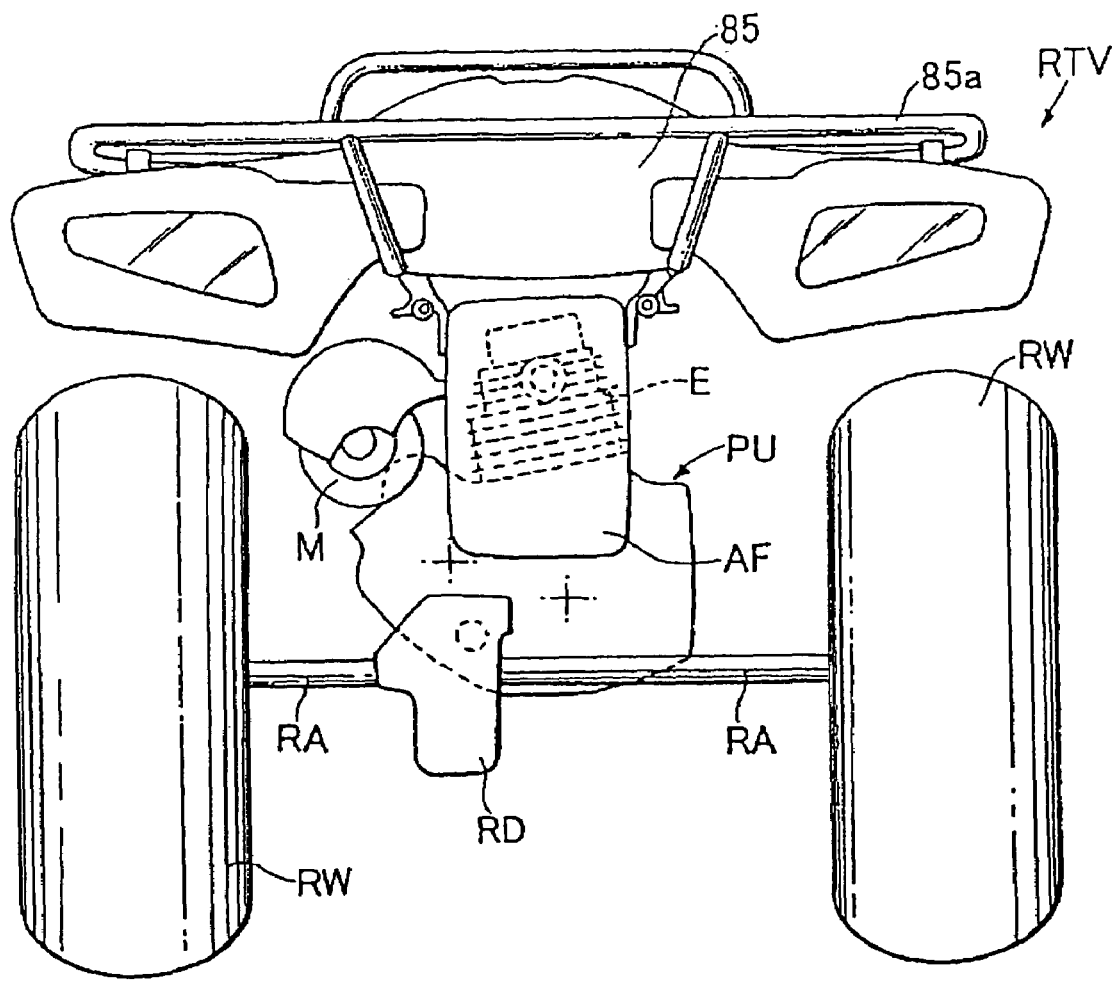
FIG. 4 is a back elevational view of the all-terrain vehicle including the hydraulic continuously variable transmission according to an embodiment of the present invention.

A selected illustrative embodiment of the present invention will be now described with reference to the drawings. First, FIGS. 2 to 4 show an all-terrain vehicle also referred to as a rugged terrain vehicle RTV, including a hydraulic continuously variable transmission according to the present invention. The vehicle RTV includes a power unit PU incorporated in a vehicle body 80 having a frame structure therein. The vehicle RTV also includes left and right front and rear wheels FW and RW which are respectively driven upon receiving the output of the power unit PU.

In addition, the vehicle body 80 includes a front fender portion 81 including a front guard 81a and located at a vehicle body front portion, a saddle portion 82 raised upwards and extending in the front-rear direction at a vehicle body central portion, left and right step portions 84, 84 extending in the left-right direction at left and right lower portions of the saddle portion 82, and a rear fender portion 85 including a rear guard 85a and located at a vehicle body rear portion, and the saddle portion 82 is provided with a seat 83 for seating a driver thereon.

Figure 1:
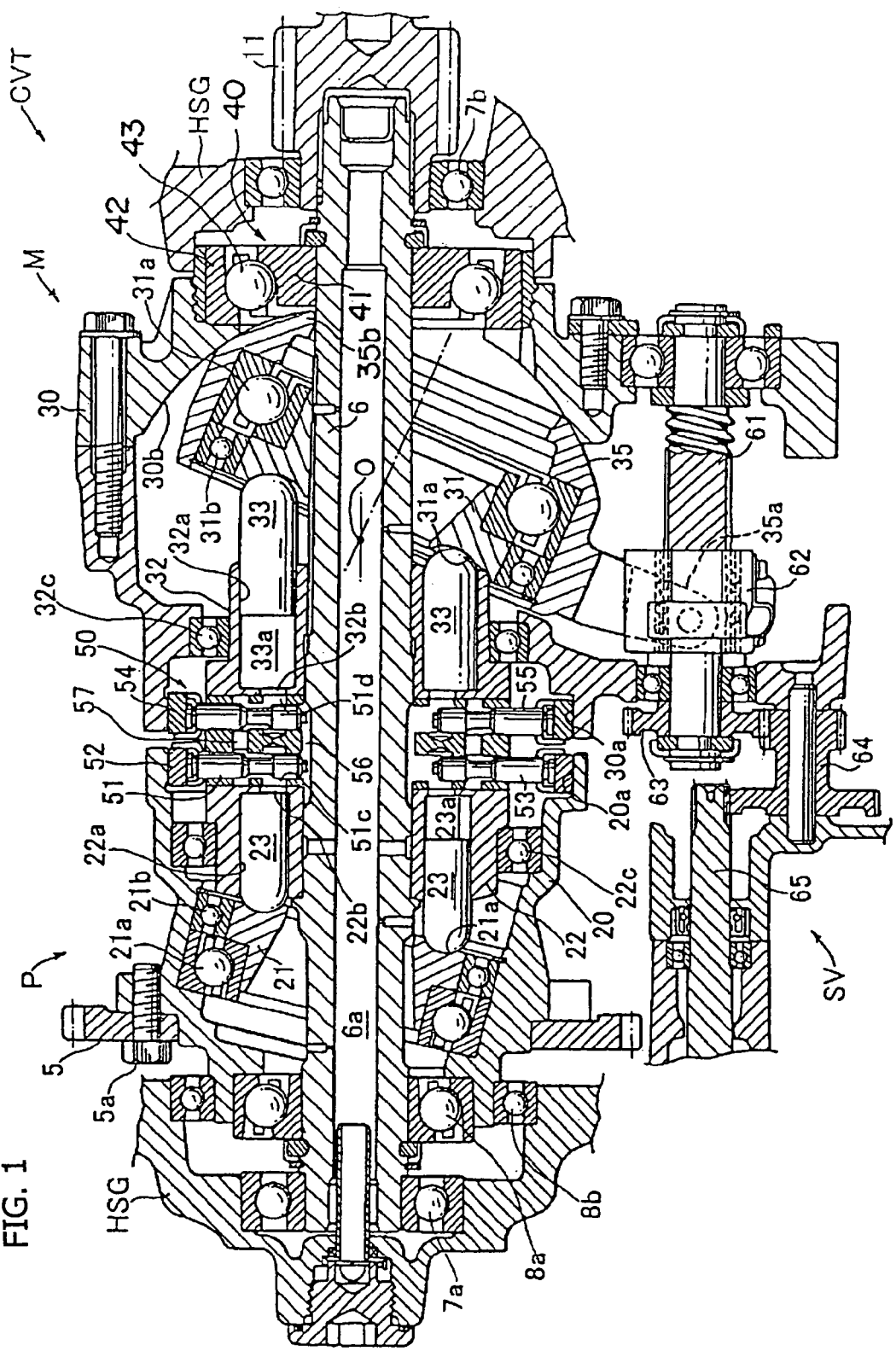
FIG. 1 is a sectional view of a hydraulic continuously variable transmission according to a selected illustrative embodiment of the present invention.

The driver thus seated on the seat 83 astride the saddle portion 82 puts his/her feet on the left and right step portions 84, and pivotingly operates a steering handle 86 located on the front side and being pivotally movable to the left and right sides. In addition, a fuel tank FT is disposed on the front side of the saddle portion 82, as shown in FIG. 1.

The power unit PU is disposed in the inside of the saddle portion 82, and the power unit PU includes an engine E, a main clutch CL, a hydraulic continuously variable transmission CVT, and a transmission gear train GT, as will be described later. The engine E is so constituted that a mixture gas formed by mixing air taken in through an air filter AF and a fuel fed from the fuel tank FT with each other in a carburetor C is taken into a cylinder and is combusted in the cylinder to thereby generate a rotary drive force. In addition, an exhaust gas discharged upon the combustion in the engine E is discharged through an exhaust pipe EP and a muffler M.

The rotary drive force of the engine E is transmitted from a crankshaft with a speed change through the main clutch CL, the hydraulic continuously variable transmission CVT and the transmission gear train GT, and is outputted to front and rear propeller shafts FP and RP. The front propeller shaft FP is connected to a front differential mechanism FD, and the rotary drive force outputted to the front propeller shaft FP is transmitted from the front differential mechanism FD to the left and right front wheels FW through left and right front axle shafts FA, to drive the front wheels FW. The rear propeller shaft RP is connected to a rear differential mechanism RD, and the rotary drive force outputted to the rear propeller shaft RP is transmitted from the rear differential mechanism RD to the left and right rear wheels RW through left and right rear axle shafts RA, to drive the rear wheels RW.

Figure 5:
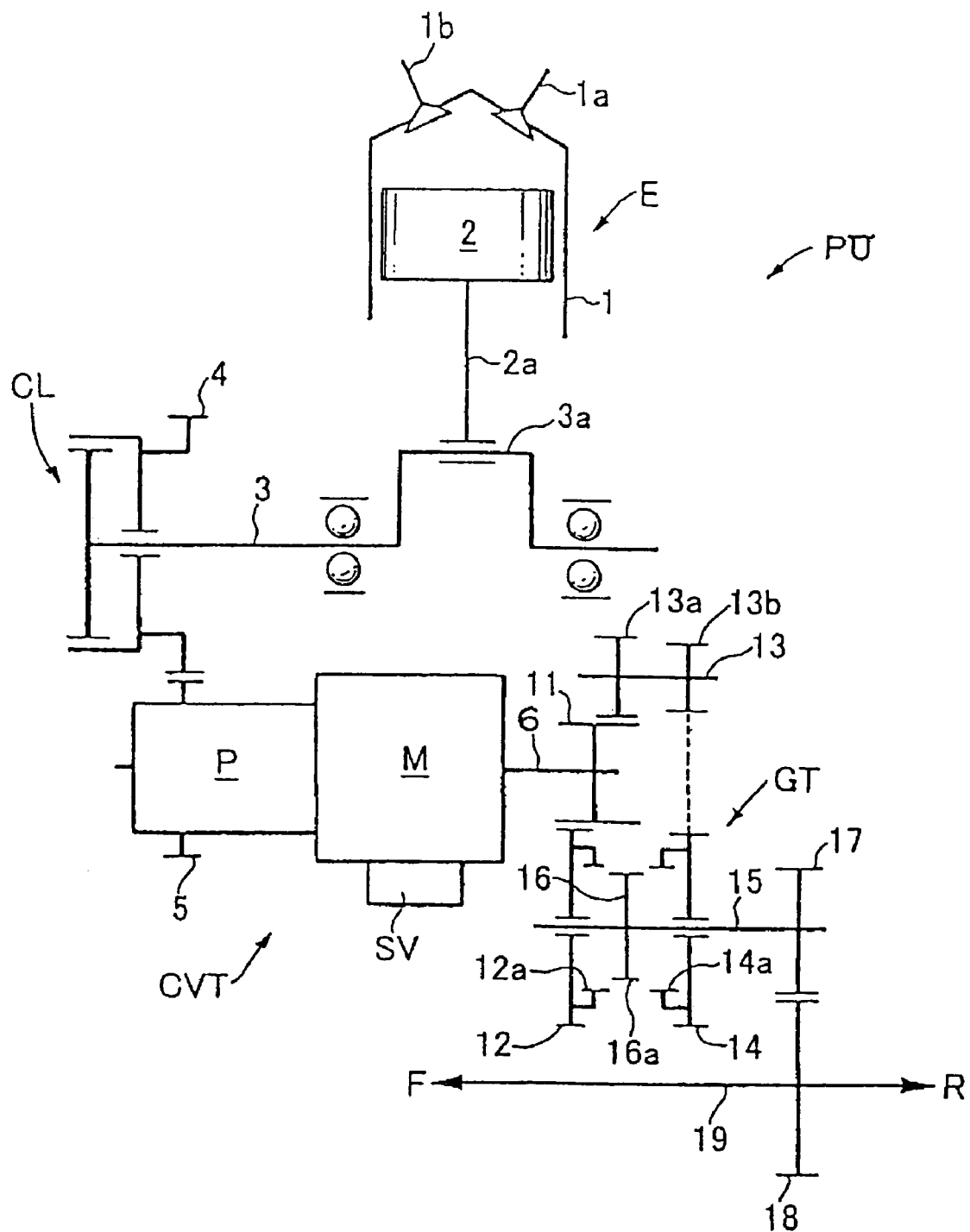
FIG. 5 is a schematic diagram showing the constitution of power transmission paths in a power unit including the hydraulic continuously variable transmission according to an embodiment of the present invention.

The power unit PU will now be described, with reference to FIG. 5. The power unit PU includes the engine E for generating the rotary drive force, the main clutch CL for controlling the transmission of the rotary drive force, the hydraulic continuously variable transmission CVT for stepless speed change of the rotary drive force transmitted through the main clutch CL, and the transmission gear train GT for direction changeover and transmission of the output rotation of the hydraulic continuously variable transmission CVT. In addition, the power unit PU is disposed below the saddle portion 82, with the engine crankshaft extending in the front-rear direction of the vehicle.

The engine E includes a piston 2 disposed in a cylinder 1 provided with intake and exhaust valves 1a and 1b in a head portion thereof. In the engine E, as mentioned above, air taken in through the air filter AF and the fuel fed from the fuel tank FT are mixed with each other in the carburetor C to form the mixture gas, which is sucked into a cylinder chamber by opening the intake valve 1a at a predetermined timing, and is combusted in the cylinder chamber to thereby reciprocate the piston 2, and the reciprocating motion of the piston 2 is transmitted through a connecting rod 2a to a crank portion 3a, whereby a crankshaft 3 is driven to rotate.

The main clutch CL is provided at an end portion of the crankshaft 3, to control the engagement and disengagement between an input drive gear 4 rotatably disposed on the crankshaft 3 and the crankshaft 3. Therefore, the rotary drive force of the crankshaft 3 is transmitted to the input drive gear 4 according to the engagement/disengagement control by the main clutch CL. In addition, the main clutch CL is composed, for example, of a centrifugal clutch.

The hydraulic continuously variable transmission CVT includes a swash plate plunger type hydraulic pump P and a swash plate plunger type hydraulic motor M. An input driven gear 5 connected to a pump casing of the swash plate plunger type hydraulic pump P is meshed with the input drive gear 4, and the rotary drive force of the engine E is transmitted to the input driven gear 5, whereby the pump casing is driven to rotate. In addition, since the input driven gear 5 is attached to a small-diameter portion of the casing of the hydraulic pump P, the effective diameter thereof can be reduced, whereby the inter-axial distance between the input driven gear 5 and the crankshaft 3 is shortened.

While details of the hydraulic continuously variable transmission CVT will be described later, the output rotation obtained through stepless speed change by the hydraulic continuously variable transmission CVT is outputted to a transmission output shaft 6.

A transmission output gear 11 of the transmission gear train GT is connected to the transmission output shaft 6, and the rotation of the transmission output shaft 6 is transmitted from the transmission output gear 11 through the transmission gear train GT. The transmission gear train GT includes a counter shaft 15 and an idler shaft 13, which are disposed in parallel to the transmission output shaft 6. On the counter shaft 15, a forward-running gear 12 and a rearward-running gear 14 are rotatably disposed, and an output drive gear 17 is disposed in a connected state. On the other hand, a first idler gear 13$a$ and a second idler gear 13$b$ are disposed in a connected state on the idler shaft 13. The forward-running gear 12 is meshed with the transmission output gear 11, and the first idler gear 13$a$ is also meshed with the transmission output gear 11. In addition, the second idler gear 13$b$ is meshed with the rearward-running gear 14.

The forward-running gear 12 and the rearward-running gear 14 are provided respectively with internal clutch gears 12$a$ and 14$a$, and a clutch sleeve 16 rotatable as one body with the counter shaft 15 and movable in the axial direction is provided between the forward-running gear 12 and the rearward-running gear 14. The clutch sleeve 16 is provided with an external clutch gear 16$a$ at the outer circumference thereof, and is so structured that the clutch sleeve 16 can be moved in the axial direction to selectively mesh with the internal clutch gears 12$a$ and 14$a$, whereby a dog tooth clutch is constituted. In addition, the clutch sleeve 16 is axially movable by the driver, to shift lever operations to the forward running side or to the rearward running side.

When a shift lever operation to the forward running side is performed by the driver, the clutch sleeve 16 is moved leftwards in the figure, the external clutch gear 16$a$ is meshed with the internal clutch gear 12$a$, and the forward-running gear 12 is connected to the counter shaft 15. In this condition, therefore, the rotation of the transmission output gear 11 is transmitted from the forward-running gear 12 to the counter shaft 15, whereby the output drive gear 17 is driven to rotate.

On the other hand, when a shift lever operation to the rearward running side is performed by the driver, the clutch sleeve 16 is moved rightwards in the figure, the external clutch gear 16$a$ is meshed with the internal clutch gear 14$a$, and the rearward-running gear 14 is connected to the counter shaft 15. In this condition, the rotation of the transmission output gear 11 is transmitted from the first idler gear 13$a$ to the second idler gear 13$b$ through the idler shaft 13, and is further transmitted from the second idler gear 13$b$ to the counter shaft 15 through the rearward-running gear 14 meshed with the second idler gear 13$b$, whereby the output drive gear 17 is driven to rotate. In addition, the rotating direction of the output drive gear 17 in this instance is in the reverse direction (rearward-running direction) relative to that in the case of the shift lever operation to the forward running side.

The output drive gear 17 is meshed with an output driven gear 18 connected and attached to a drive shaft 19, so that the rotation of the output drive gear 17 is transmitted to the drive shaft 19 through the output driven gear 18. The front end of the drive shaft 19 is connected to the front propeller shaft FP, while the rear end of the drive shaft 19 is connected to the rear propeller shaft RP, and the rotary drive force transmitted to the drive shaft 19 is transmitted to the front and rear propeller shafts FP and RP, whereby the front and rear wheels FW and RW are driven, as mentioned above.

Next, the hydraulic continuously variable transmission CVT will be described referring to FIG. 1 and FIGS. 6 to 8. The hydraulic continuously variable transmission CVT includes the swash plate plunger type hydraulic pump P and the swash plate plunger type hydraulic motor M, with the transmission output shaft 6 disposed to extend through the center thereof. In addition, the transmission output shaft 6 is supported by ball bearings 7$a$ and 7$b$, to be rotatable relative to a transmission housing HSG.

The hydraulic pump P includes a pump casing 20, disposed on the transmission output shaft 6 to be coaxial with and rotatable relative to the transmission output shaft 6, and a pump swash plate member 21, disposed inside the pump casing 20 and inclined at a predetermined angle to the rotary center axis of the pump casing 20.

The hydraulic pump P also includes a pump cylinder 22, disposed opposite to the pump swash plate member 21, and a plurality of pump plungers 23, slidably disposed in a plurality of pump plunger holes 22$a$ formed to extend in the axial direction in an annular layout surrounding the center axis of the pump cylinder 22.

The pump casing 20 is rotatably supported on the transmission output shaft 6 through a bearing 8$a$, and is supported by a bearing 8$b$ to be rotatable relative to the transmission housing HSG. The pump swash plate member 21 is supported by bearings 21$a$ and 21$b$ to be rotatable about an axis inclined at the predetermined angle relative to the pump casing 20. The pump cylinder 22 is supported by a bearing 22$c$ to be coaxial with and rotatable relative to the pump casing 20.

The input driven gear 5 is fastened to the outer circumference of the pump casing 20 by bolts 5$a$. In addition, an outside end portion of each of the plungers 23 projects outwards to contact and engage with a swash plate surface 21$a$ of the pump swash plate member 21. An inside end portion of each of the plungers 23, located in the pump plunger hole 22$a$, is opposed to a valve body 51 in a distribution valve 50 (which will be described later), thereby forming a pump oil chamber 23$a$ in the pump plunger hole 22$a$.

In addition, pump openings 22$b$, functioning as pump discharge and suction ports, are provided at end portions of the pump plunger holes 22$a$. When the input driven gear 5 is driven to rotate as above-mentioned, the pump casing 20 is driven to rotate, the pump swash plate member 21 disposed in the inside of the pump casing 20 is oscillated attendant on the rotation of the pump casing 20, and the pump plungers 23 are sequentially reciprocated in the pump plunger holes 22$a$ according to the oscillating movement of the swash plate surface 21$a$, to apply compressive and expansive forces to a working oil inside of the pump oil chambers 23$a$.

The hydraulic motor M includes a motor casing 30, connected to and firmly held on the transmission housing HSG, a motor cylinder 32 rotatably supported in the motor casing, and a motor pivot member 35. The motor pivot member 35 is supported through sliding contact with a concave hemispherical support socket 30$b$, formed on the inside surface of the motor casing 30. The motor pivot member 35 is supported to be pivotally movable about an oscillation center O extending in a perpendicular direction (in the direction perpendicular to the paper surface) relative to the center axis of the transmission output shaft 6.

The hydraulic motor M also includes a motor swash plate member 31, rotatably supported inside the motor pivot member 35 by bearings 31$a$ and 31$b$, and a plurality of motor plungers 33, which are slidably disposed in a plurality of motor plunger holes 32a, formed to extend in the axial direction in an annular layout surrounding the center axis of the motor cylinder 32. In addition, the motor cylinder 32 is rotatably supported, at an outer circumferential portion thereof, in the motor casing 30 through a bearing 32c.

An outside end portion of each of the motor plungers 33 projects outwards to make contact and engagement with a swash plate surface 31a of the motor swash plate member 31, Each motor plunger 33 has an inside end portion thereof located in the plunger hole 32a and opposed to the valve body 51, thereby forming a motor oil chamber 33a in the motor plunger hole 32a. In addition, motor openings 32b functioning as motor discharge and suction ports are formed at end portions of the motor plunger holes 32a.

An arm portion 35a, formed by projecting an end portion of the motor pivot member 35 toward the outer diameter side, projects radially outwards to be connected to a motor servo mechanism SV, which provides a control for moving the arm portion 35a in the left-right direction in the figure, and in this way, a control is provided for pivotally moving the motor pivot member 35 about the oscillation center O. When the motor pivot member 35 is thus moved, the motor swash plate member 31, rotatably supported inside the motor pivot member 35, is also concurrently pivotally moved, with the result of a change in the swash plate angle.

The distribution valve 50 is interposed between the pump cylinder 22 and the motor cylinder 32. The valve body 51 of the distribution valve 50 is clamped between the pump cylinder 22 and the motor cylinder 32 to achieve an integral connection, and is also connected to the transmission output shaft 6.

Therefore, it will be understood that the pump cylinder 22, the distribution valve 50, the motor cylinder 32, and the transmission output shaft 6 are all rotated concurrently together, as one body. In addition, this rotation is enabled by the structure in which the transmission output shaft 6 is supported by the ball bearings 7a and 7b to be rotatable relative to the transmission housing HSG, and is supported by the ball bearing 40 to be rotatable relative to the motor casing 30.

Figure 7:
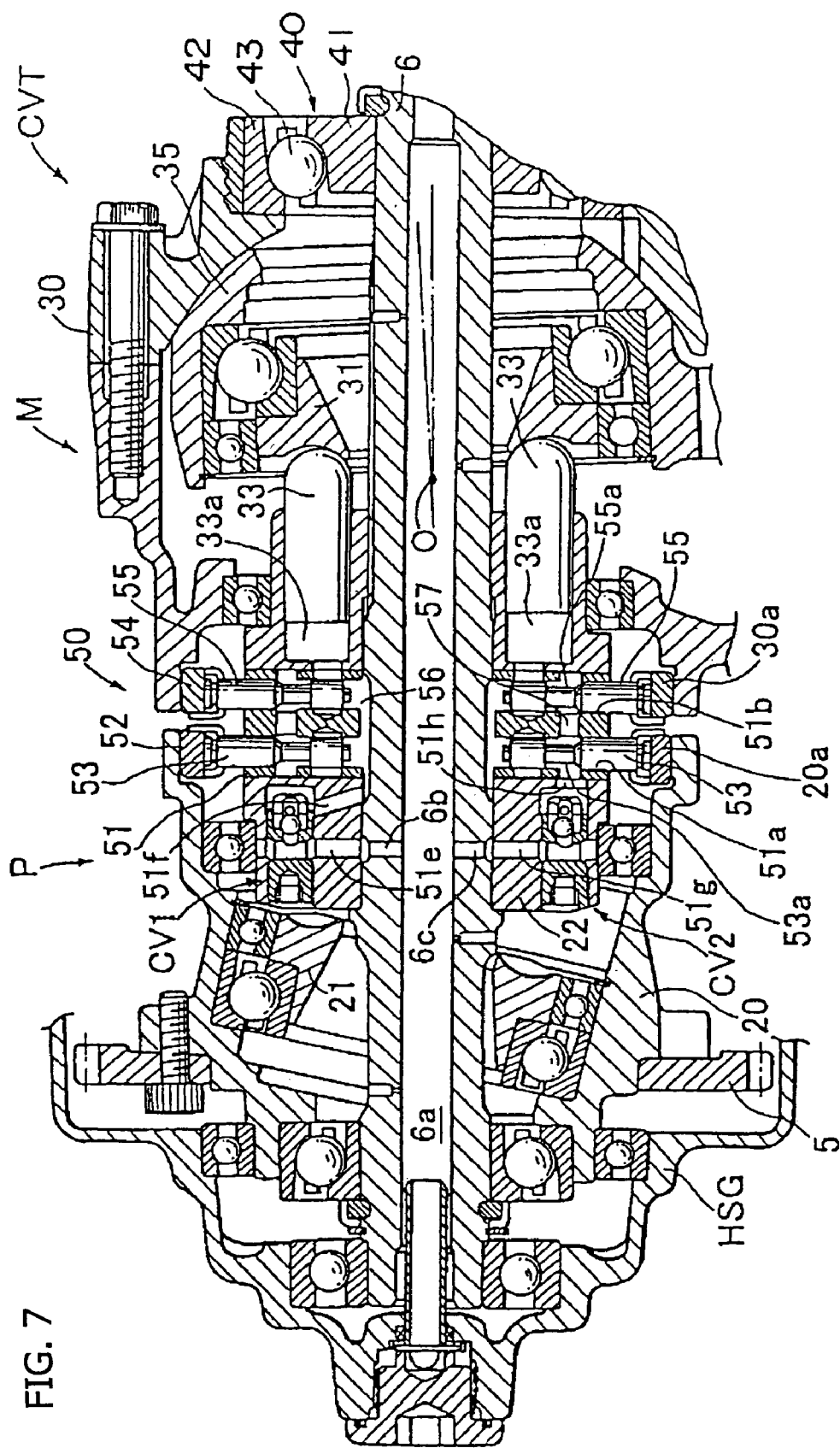
FIG. 7 is a cross-sectional view of the hydraulic continuously variable transmission according to an embodiment of the present invention.

As symbols clearly shown particularly in FIG. 7, a plurality of pump-side spool holes 51a, and a plurality of motor-side spool holes 51b are provided in the valve body 51 of the distribution valve 50, extending radially and laid out at regular intervals along the circumferential direction, in two rows. Pump-side spools 53 are slidably disposed in the pump-side spool holes 51a, and motor-side spools 55 are slidably disposed in the motor-side spool holes 51b.

The pump-side spool holes 51a are formed in correspondence with the pump plunger holes 22a, and the valve body 51 is provided with a plurality of pump-side communication passages 51c for communication between the corresponding pairs of the pump openings 22b (the pump oil chambers 23a) and the pump-side spool holes 51a. The motor-side spool holes 51b are formed in correspondence with the motor plunger holes 32a, and the valve body 51 is provided with a plurality of motor-side communication passages 51d for communication between the corresponding pairs of the motor openings 32b (the motor oil chambers 33a) and the motor-side spool holes 51b (see FIG. 1).

In the distribution valve 50, further, a pump-side cam ring 52 is disposed at a position surrounding the outer circumferential end portions of the pump-side spools 53, and a motor-side cam ring 54 is disposed at a position surrounding the outer circumferential end portion of the motor-side spools 55. The pump-side cam ring 52 is mounted inside an eccentric inner circumferential surface 20a, formed on the tip end inside surface of the pump casing 20 with an eccentricity from the rotary center axis of the pump casing 20, and is rotated as one body with the pump casing 20. The motor-side cam ring 54 is mounted inside an eccentric inner circumferential surface 30a, formed on the tip end inside surface of the motor casing 30 with an eccentricity from the rotary center axis of the motor cylinder 32.

In addition, the outer circumferential ends of the pump-side spools 53 are relatively rotatably engaged and stopped on the inner circumferential surface of the pump-side cam ring 52, and the outer circumferential ends of the motor-side spools 55 are relatively rotatably engaged and stopped on the inner circumferential surface of the motor-side cam ring 54.

An inside passage 56 is formed between the inner circumferential surface of the valve body 51 and the outer circumferential surface of the transmission output shaft 6, and inner circumferential end portions of the pump-side spool holes 51a and the motor-side spool holes 51b are communicated with the inside passage 56. In addition, the valve body 51 is provided therein with an outside passage 57 for communication between the pump-side spool holes 51a and the motor-side spool holes 51b.

Here, the operations of the distribution valve 50, constituted as above, will be described. When the drive force of the engine E is transmitted to the input driven gear 5 and the pump casing 20 is driven to rotate, the pump swash plate member 21 is oscillated according to the rotation. Therefore, the pump plungers 23 in contact and engagement with the swash plate surface 21a of the pump swash plate member 21 are sequentially reciprocated in the axial direction in the pump plunger holes 22a.

As a result of the sequential reciprocating movement of the pump plungers 23, the working oil is first discharged from the pump oil chambers 23a through the pump openings 22b according to the inward movements of the pump plungers 23, and subsequently in the rotation, the working oil is sucked into the pump chambers 23a through the pump openings 22b, according to the outward movements of the pump plungers 23.

In this instance, the pump-side cam ring 52 attached to an end portion of the pump casing 20 is rotated together with the pump casing 20, and, since the pump-side cam ring 52 is mounted with an eccentricity relative to the rotary center of the pump casing 20, the pump-side spools 53 are reciprocated in the radial direction inside the pump-side spool holes 51a, according to the rotation of the pump-side cam ring 52.

In the reciprocation of the pump-side spools 53, when the pump-side spool 53 is moved toward the inner diameter side as shown in the upper half of FIG. 1, the pump-side communication passage 51c and the outside passage 57 are communicated with each other through a spool groove 53a. On the other hand, when the pump-side spool 53 is moved toward the outer diameter side as shown in the lower half of FIG. 1, the pump-side passage 51c and the inside passage 56 are communicated with each other through the spool groove 53a.

Here, the eccentric mount position is so set that, when the swash plate member 21 is oscillated attendant on the rotation of the pump casing 20, and the pump plungers 23 are thereby sequentially reciprocated, in a half rotation of the pump casing 20 in which the pump plunger 23 is moved from a most pushed-outward position (referred to as the bottom dead center) to a most pushed-inward position (referred to as the top dead center), the pump-side cam ring 52 moves the pump-side spool 53 toward the inner diameter side, and, in a half rotation of the pump casing 20 in which the pump plunger 23 is moved from the top dead center to the bottom dead center, the pump-side cam ring 52 moves the pump-side spool 53 toward the outer diameter side.

As a result, when the pump plunger 23 is moved from the bottom dead center to the top dead center attendant on the rotation of the pump casing 20, and the working oil in the pump oil chamber 23a is thereby discharged through the pump opening 22b, the working oil is fed out through the pump-side communication passage 51c into the outside passage 57. On the other hand, when the pump plunger 23 is moved from the top dead center to the bottom dead center attendant on the rotation of the pump casing 20, the working oil in the inside passage 56 is sucked into the pump oil chamber 23a through the pump-side communication passage 51c and the pump opening 22b. As seen from this, when the pump casing 20 is driven to rotate, the working oil discharged from the hydraulic pump P is supplied into the outside passage 57, and the working oil is sucked from the inside passage 56 into the hydraulic pump P.

On the other hand, the motor-side cam ring 54 attached to an end portion of the motor casing 30 is also mounted with an eccentricity relative to the rotary center of the motor casing 30, so that, when the motor cylinder 32 is rotated, the motor-side spools 55 are reciprocated in the radial direction inside the motor-side spool holes 51b according to the rotation.

In the reciprocation of the motor-side spools 55, when the motor-side spool 55 is moved toward the inner diameter side as shown in the upper half of FIG. 1, the motor-side communication passage 51d and the outside passage 57 are communicated with each other through a spool groove 55a; on the other hand, when the motor-side spool 55 is moved toward the outer diameter side as shown in the lower half of FIG. 1, the motor-side passage 51d and the inside passage 56 are communicated with each other through a spool groove 55a.

Here, as has been described above, the working oil discharged from the hydraulic pump P is fed into the outside passage 57, and the working oil is supplied from the motor-side communication passage 51d into the motor oil chambers 33a through the motor openings 32b, whereby the motor plungers 33 are pushed outwards in the axial direction. Outside end portions of the motor plungers 33, thus receiving the axially outward-pushing forces, are in sliding contact with the portion ranging from the top dead center to the bottom dead center of the motor swash plate member 31, in the condition where the motor pivot member 35 is oriented as shown in FIG. 1, and the motor cylinder 32 is driven to rotate, so that the motor plungers 33 are each moved along the motor swash plate member 31 from the top dead center to the bottom dead center by the axially outward pushing force.

In order to achieve such a rotary driving, the eccentric mount position of the motor-side cam ring 54 is so set that, when the motor plungers 33 are each reciprocated along the inclination of the motor swash plate member 31 attendant on the rotation of the motor cylinder 32, in a half rotation of the motor cylinder 32 in which the motor plunger 33 is moved from a most pushed-outward position (bottom dead center) to a most pushed-inward position (top dead center), the motor-side cam ring 54 moves the motor-side spool 55 toward the outer diameter side, and, in a half rotation of the motor cylinder 32 in which the motor plunger 33 is moved from the top dead center to the bottom dead center, the motor-side cam ring 54 moves the motor-side spool 55 toward the outer diameter side.

When the motor cylinder 32 is thus driven to rotate, the motor plunger 33 is pushed and moved inwards when moving along the motor swash plate member 31 from the bottom dead center to the top dead center, whereby the working oil in the motor oil chamber 33a is fed from the motor opening 32b into the inside passage 56 through the motor-side communication passage 51d. The working oil thus fed into the inside passage 56 is sucked into the pump oil chamber 23a through the pump-side communication passage 51c and the pump opening 22b.

As is seen from the above description, when the pump casing 20 is driven to rotate by receiving the rotary drive force of the engine E, the working oil is discharged from the hydraulic pump P into the outside passage 57, and is fed to the hydraulic motor M, to drive the motor cylinder 32 to rotate. The working oil is fed into the inside passage 56, after having driven the motor cylinder 32 to rotate, and is sucked from the inside passage 56 into the hydraulic pump P.

Thus, the closed hydraulic circuit for connecting the hydraulic pump P and the hydraulic motor M to each other includes the distribution valve 50. The working oil discharged from the hydraulic pump P according to the rotation of the hydraulic pump P is fed through the closed hydraulic circuit to the hydraulic motor M, to drive the hydraulic motor M to rotate, and the working oil, discharged after driving the hydraulic motor M, is returned through the closed hydraulic circuit to the hydraulic pump P.

In this case, since the pump cylinder 22 and the motor cylinder 32 are connected to the transmission output shaft 6 and are rotated as one body with the latter, when the motor cylinder 32 is driven to rotate as above-mentioned, the pump cylinder 22 is also rotated together, and the relative rotating speed of the pump casing 20 and the pump cylinder 22 is reduced. Therefore, the relationship between the rotating speed Ni of the pump casing 20 and the rotating speed No of the transmission output shaft 6 (namely, the rotating speed of the pump cylinder 22 and the motor cylinder 32) is as represented by the following equation (1) in relation to the pump volume Vp and the motor volume Vm.

$$Vp \cdot (Ni - No) = Vm \cdot No \qquad \text{Equation 1}$$

The motor volume Vm can be steplessly varied by a control for pivoting the motor pivot member 35 by the motor servo mechanism SV. Therefore, when it is assumed that the rotating speed Ni of the pump swash plate member 21 in the above equation (1) is constant, a control for steplessly varying the motor volume Vm causes a speed change control for a stepless speed change of the rotation of the transmission output shaft 6.

When a control for reducing the pivot angle of the motor pivot member 35 is performed, the motor volume Vm is reduced, and, when it is assumed that the pump volume Vp is constant and the rotating speed Ni of the pump swash plate member 21 is constant in the relationship of the above equation (1), there results a control for an increase in speed for causing the rotation of the transmission output shaft 6 to approach the rotating speed Ni of the pump swash plate member 21, i.e., a stepless speed change control to a top speed change stage.

At the time when the motor swash plate angle becomes zero, i.e., when the motor swash plate becomes upright, a speed change ratio of Ni=No (top speed change ratio) is theoretically attained, and a hydraulic lock condition results in which the pump casing 20 is rotated as one body with the pump cylinder 22, the motor cylinder 32 and the transmission output shaft 6, to achieve a mechanical power transmission.

Figure 6:
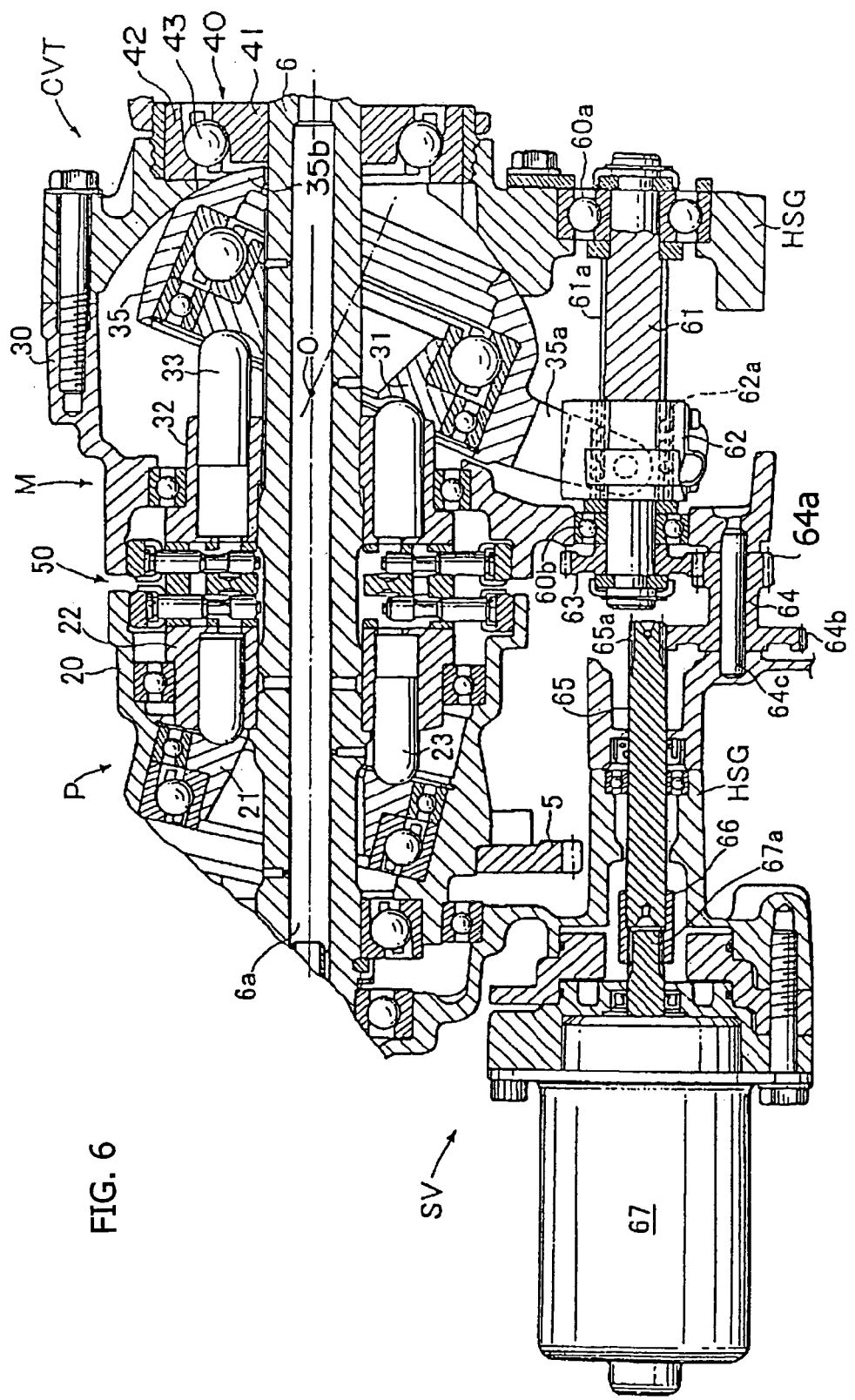
FIG. 6 is a cross-sectional view of the hydraulic continuously variable transmission according to an embodiment of the present invention.

While the control for steplessly varying the motor volume as above-mentioned is performed by a variable control of the motor swash plate angle through pivoting the motor pivot member 35, the motor servo mechanism SV for pivoting the motor pivot member 35 in this manner will be described below, referring principally to FIG. 6.

The motor servo mechanism SV includes a ball screw shaft 61 located in the vicinity of the arm portion 35a of the motor pivot member 35, extending in parallel to the transmission output shaft 6, and supported by bearings 60a and 60b to be rotatable relative to the transmission housing HSG. The motor servo mechanism SV also includes a ball nut 62, disposed in screw engagement with a male screw 61a formed at the outer circumference of the ball screw shaft 61.

In addition, a ball female screw 62a, composed of a multiplicity of balls held arranged in a screw form by a cage, is provided at the inner circumference of the ball nut 62, and the male screw 61a is screw-engaged with the ball female screw 62a. The ball nut 62 is connected to the arm portion 35a of the motor pivot member 35, and, when the ball screw shaft 61 is driven to rotate, the ball nut 62 is moved in the left-right direction on the shaft 61, whereby the motor pivot member 35 is pivotally moved.

In order to drive the ball screw shaft 61 to rotate in this manner, an electric swash plate control motor 67 (FIG. 6) is attached to the outside surface of the transmission housing HSG. A drive shaft 67a of the swash plate control motor 67 is connected to a spacer shaft 65 through a coupling 66. The spacer shaft 65 extends inside the transmission housing HSG in parallel to the transmission output shaft 6, extends beyond the outer circumference of the input driven gear 5 to the vicinity of an end portion of the ball screw shaft 61, and is rotatably supported on the transmission housing HSG. On the other hand, an idle shaft 64c extending in parallel to the spacer shaft 65 is supported on the transmission housing HSG, and an idle gear member 64 is rotatably mounted on the idle shaft 64c.

The spacer shaft 65 is provided at its tip end with a first gear 65a, which is meshed with a second, larger gear 64b, integrally formed on the idle gear member 64. In addition, a third gear 64a, integrally formed on the idle gear member 64, is meshed with a fourth gear 63 connected to an end portion of the ball screw shaft 61.

Therefore, when the swash plate control motor 67 is operated, and the drive shaft 67a is rotated thereby, the rotation is transmitted through the idle gear member 64 to the fourth gear member 63. As a result, the swash plate control motor 67, acting through the gear members 65a, 64b, 64a, and 63, is operable to rotate the ball screw shaft 61, whereby the ball nut 62 is moved on the shaft 61 in the left-right direction, and a control operation for pivotally moving the motor pivot member 35 is performed.

When the movement of the motor pivot member 35 is thus controlled by the swash plate control motor 67, and a continuously variable speed change control is thereby performed, a minimum speed change (TOP speed change ratio) is attained when the motor swash plate angle is zero, and a maximum speed change (LOW speed change ratio) is attained when the motor swash plate angle is at maximum.

In order to widen the speed change range from the minimum speed change to the maximum speed change, it helps to enlarge the maximum motor swash plate angle as much as possible. The condition where the motor swash plate angle is at maximum, i.e., the condition where the motor pivot member 35 is most largely pivoted, is shown in FIGS. 1 and 6. In order to secure such a maximum pivot angle, the width of an inner race 41 of the ball bearing 40 is specially configured to be less than the width of an outer race 42.

A general radial ball bearing has a configuration in which a ball assembly is clamped between an inner race and an outer race. In this modified ball bearing 40, a side surface of the inner race 41, on the side facing the motor pivot member 35, is recessed inwardly relative to the corresponding surface of the outer race. This reduces the chance of interference between a rear end portion 35b of the motor pivot member 35 and the inner race 41, and as a result, the pivot angle of the motor pivot member 35 is enlarged, and the speed change range is widened.

In addition, the distance that the inner race is recessed is selected so that the ball rolling region of the ball assembly 43, clamped between the outer race 42 and the inner race 41, can be maintained without compromise, and effective operation of the ball bearing assembly 43 is preserved.

With the inwardly-facing side surface of the inner race 41 recessed in this manner, an end portion of the motor pivot member 35 can be made to have a substantially flat surface which is substantially perpendicular to the axis thereof, so that the outer circumferential spherical surface thereof can be processed continuously, and the number of processing steps can be reduced.

Meanwhile, when the oil flows through the closed hydraulic circuit and the hydraulic force is thereby transmitted between the hydraulic pump P and the hydraulic motor M as above-mentioned, leakage of the oil from the closed hydraulic circuit, and leakage of the oil from the fitting portions between the pump and motor plunger holes 22a, 32a and the pump and motor plungers 23, 33 may occur.

In view of this potential for possible leakage, the transmission output shaft 6 is provided with a charge oil supply hole 6a extending in the axial direction, and, as shown in FIG. 7, the charge oil supply hole 6a is connected to a first check valve CV1, disposed in the pump cylinder 22 through an oil passage 6b formed in the transmission output shaft 6 and an oil passage 51e formed in the pump cylinder 22, and further connected from the first check valve CV1 to the inside passage 56 through an oil passage 51f. Therefore, charge oil supplied from a charge oil supply source (not shown) into the charge oil supply hole 6a is supplied through the first check valve CV1 into the inside passage 56, as required.

In addition, the charge oil supply hole 6a is connected to a second check valve CV2 disposed in the pump cylinder 22 through an oil passage 6c formed in the transmission output shaft 6 and an oil passage 51g formed in the pump cylinder 22, and is further connected from the second check valve CV2 to the outside passage 57 through an oil passage 51h. Therefore, the charge oil supplied into the charge oil supply hole 6a is supplied through the second check valve CV2 into the outside passage 57, as required.

As seen from the above description of the operations of the hydraulic pump P and the hydraulic motor M, in a normal running condition, i.e., in the condition where the hydraulic motor M is driven to rotate under the supply of the working oil from the hydraulic pump P, a higher pressure is present in the outside passage 57 and a lower pressure is present in the inside passage 56, so that the charge oil is supplied into the inside passage 56 through the first check valve CV1. However, in the condition where the vehicle is running under an engine brake action, a lower pressure is present in the outside passage 57 and a higher pressure is present in the inside passage 56, so that the charge oil is supplied into the outside passage 57 through the second check valve CV2.

Figure 8:
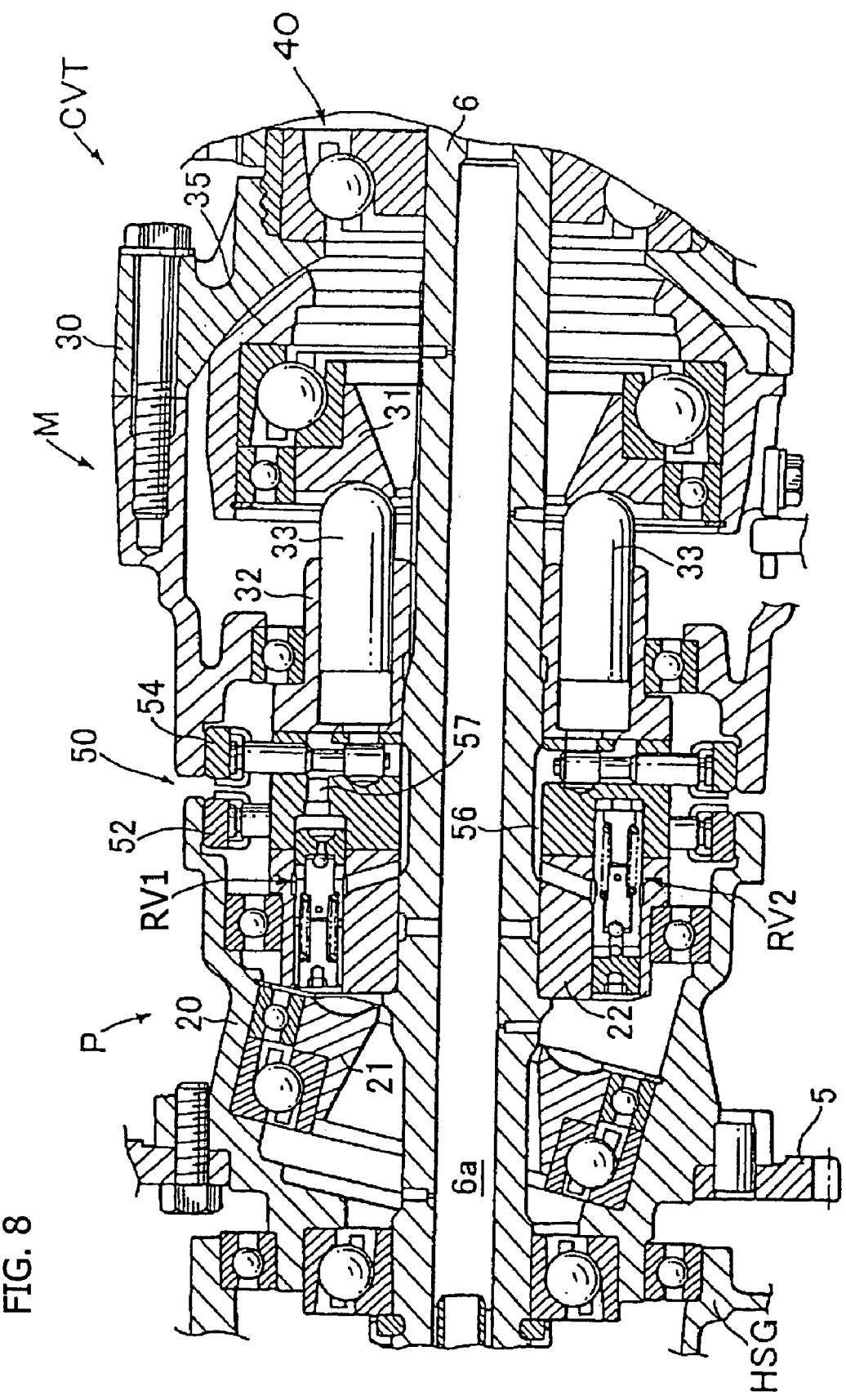
FIG. 8 is a cross-sectional view of the hydraulic continuously variable transmission according to an embodiment of the present invention.

As shown in FIG. 8, first and second pressure relief valves RV1 and RV2 are also disposed in the pump cylinder 22. First, the first pressure relief valve RV1 is disposed in the state of connecting the outside passage 57 and the inside passage 56 to each other, and, when the oil pressure in the outside passage 57 reaches or exceeds a predetermined pressure, the first pressure relief valve RV opens to relieve the oil pressure into the inside passage 56, thereby preventing the oil pressure in the outside passage 57 from becoming excessively high. The second pressure relief valve RV2 is disposed in the state of connecting the inside passage 56 and the outside passage 57 to each other, and, when the oil pressure in the inside passage 56 reaches or exceeds a predetermined pressure, the second pressure relief valve RV2 opens to relieve the oil pressure into the outside passage 57, thereby preventing the oil pressure in the inside passage 56 from becoming excessively high.

In addition, while an example of the hydraulic continuously variable transmission in which the continuously variable speed change control is performed by variably regulating the motor swash plate angle has been shown in the above description, the present invention can be similarly applied also to a continuously variable transmission in which the pump swash plate angle is variably regulated and to a continuously variable transmission in the pump and motor swash plate angles are both variably regulated.

As has been described above, according to the present invention, at least one of the pump swash plate and the motor swash plate is supported by the swash plate support member (motor casing) to be pivotally movable, with the swash plate angle being variably adjustable, the output shaft for supporting the pump cylinder of the swash plate plunger pump and the motor cylinder of the swash plate plunger motor is rotatably supported through the plurality of rotatable bearings, and the inner race of the rotatable bearing attached to the swash plate support member and rotatably supporting the output shaft, of the rotatable bearings, is formed by cutting off an end face portion in the width direction, on the side of facing the pump swash plate or the motor swash plate supported by the swash plate support member so as to be pivotally movable. Therefore, the pivot angle, over which the pump or motor swash plate member can be moved without interference with the inner race can be widened, so that it is possible to widen the regulation range of the motor swash plate angle and to widen the speed change control range. Besides, since an end portion of the pump or swash plate member (for example, the motor pivoting member in the embodiment) can be made to be a flat surface perpendicular to the axis, the outer circumferential spherical surface thereof can be processed continuously, and the number of processing steps can be reduced.

Although the present invention has been described herein with respect to a specific illustrative embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having thus, described the invention, what is claimed is:

1. A hydraulic continuously variable transmission, comprising:
    a swash plate plunger pump comprising a pump swash plate and a pump cylinder adjacent said pump awash plate;
    a swash plate plunger motor comprising a motor swash plate and a motor cylinder adjacent said motor swash plate;
    a swash plate support member for supporting one of said swash plates;
    an output shaft extending through and supporting said pump cylinder and said motor cylinder, said output shaft being rotatably supported through a plurality of rotatable bearings, wherein one of said rotatable bearings is attached to said swash plate support member and comprises a ball bearing; and
    a closed hydraulic circuit interconnecting said swash plate plunger pump and said swash plate plunger motor;
    wherein at least one of said pump swash plate and said motor swash plate is supported by said swash plate support member so as to be pivotally movable, with a swash plate angle thereof being variably adjustable;
    and wherein the one of said rotatable bearings comprises an inner race and an outer race, and the inner race of the rotatable bearing attached to said swash plate support member is recessed, relative to the outer race thereof, on the side facing said pivotally movable swash plate.

2. The hydraulic continuously variable transmission of claim 1, wherein said motor swash plate is pivotally movable relative to the swash plate support member, and further comprises a motor pivot member supported on said swash plate support member.

3. The hydraulic continuously variable transmission of claim 2, wherein said swash plate support member has a concave hemispherical support socket formed therein which is truncated by the one of said rotatable bearings and wherein said motor pivot member is supported trough sliding contact with said support socket of said motor casing so that an end portion of the motor pivot member confronts said inner race.

4. The hydraulic continuously variable transmission of claim 3, wherein said motor pivot member has an end portion with a substantially flat surface which is substantially perpendicular to the axis thereof.

5. A hydraulic continuously variable transmission, comprising:
    a hollow transmission housing;
    a motor casing disposed within said transmission housing;
    a motor pivot member supported by said motor casing;
    a swash plate plunger pump disposed within said housing and comprising a pump swash plate and a pump cylinder;
    a swash plate plunger motor rotatably supported on said motor pivot member and comprising a motor swash plate and a motor cylinder; and
    an output shalt extending through and supporting said pump cylinder and said motor cylinder, said output shaft being rotatably supported in said housing through a plurality of rotatable bearings, wherein one of said rotatable bearings is attached to said motor casing and comprises a ball bearing including an inner race and an outer race;
    wherein said motor swash plate is supported by said motor pivot member so as to be pivotally movable, with a swash plate angle thereof being variably adjustable;
    and wherein a plane perpendicular to said output shaft is defined by a surface of said outer race, wherein a surface of said motor pivot member intersects said plane in at least one position of said motor pivot member, and wherein said inner race is spaced from said plane.

6. The hydraulic continuously variable transmission of claim 5, wherein said motor casing has a concave hemispherical support socket formed therein, and wherein said motor pivot member is supported through sliding contact with said support socket of said motor casing.

7. The hydraulic continuously variable transmission of claim 5, wherein said motor pivot member has an end portion with a substantially flat surface which is substantially perpendicular to the axis thereof.

* * * * *